US005952936A

United States Patent [19]

Enomoto

[11] Patent Number: 5,952,936

[45] Date of Patent: Sep. 14, 1999

[54] BIDIRECTIONAL REMOTE CONTROL SYSTEM USING INTERRUPT ARBITRATION

[75] Inventor: Toshio Enomoto, Tokyo, Japan

[73] Assignee: NEC Corporation, Tokyo, Japan

[21] Appl. No.: 08/917,277

[22] Filed: Aug. 25, 1997

[30] Foreign Application Priority Data

Aug. 23, 1996 [JP] Japan .................................... 8-222388

[51] Int. Cl.[6] ...................................................... H04B 10/24

[52] U.S. Cl. ................................ 340/825.69; 340/825.57; 340/825.25; 341/176; 375/239; 359/146; 455/151.2; 348/734; 370/213

[58] Field of Search .......................... 340/825.69, 825.62, 340/825.58, 825.59, 825.57, 825.25; 341/176, 173; 375/239; 359/146, 142; 455/151.1, 151.2; 348/734; 332/106, 112; 370/213; 1/1

[56] References Cited

U.S. PATENT DOCUMENTS

| | | | |
|---|---|---|---|
| 4,914,428 | 4/1990 | Kobayashi et al. | 340/825.62 |
| 5,043,723 | 8/1991 | Araki et al. | 340/825.69 |
| 5,182,551 | 1/1993 | Goto | 340/825.69 X |
| 5,532,684 | 7/1996 | Katsu | 340/825.25 |
| 5,579,496 | 11/1996 | Van Steenburgge | 348/734 X |
| 5,699,065 | 12/1997 | Murray | 341/176 |
| 5,850,189 | 12/1998 | Sakanaka et al. | 340/825.62 X |
| 5,877,702 | 3/1999 | Kohler | 340/825.69 X |

FOREIGN PATENT DOCUMENTS

| | | |
|---|---|---|
| 0 587 982 A1 | 3/1994 | European Pat. Off. . |
| 43 31 543 A1 | 3/1994 | Germany . |
| 62-132494 | 6/1987 | Japan . |
| 4-115397 | 4/1992 | Japan . |
| 5-6493 | 1/1993 | Japan . |
| 5-41693 | 2/1993 | Japan . |
| 6-90484 | 3/1994 | Japan . |
| 6-98383 | 4/1994 | Japan . |

OTHER PUBLICATIONS

Masaaki, Patent Abstracts of Japan, vol. 013, No. 230, 1989 –01 036290 A, Feb. 1989.

*Primary Examiner*—Michael Horabik
*Assistant Examiner*—William H. Wilson, Jr.
*Attorney, Agent, or Firm*—Foley & Lardner

[57] ABSTRACT

A data format is formed by a start code, an identification code and its inverted code, a first data code and a second data code, each of these codes being a single byte code, which is then followed by an interrupt arbitration period. Thus, when compared with a prior art data format, an inverted data code and an stop code of the prior art one are replaced respectively by the second data code and the interrupt arbitration period TI to realize upper compatibility. A remote controller transmitting a signal transmits an acknowledge code or a non-acknowledge code within the interrupt arbitration period depending on the interrupt code it receives after its current signal transmitting operation is temporarily switched to a signal receiving operation within the interrupt arbitration period.

6 Claims, 14 Drawing Sheets

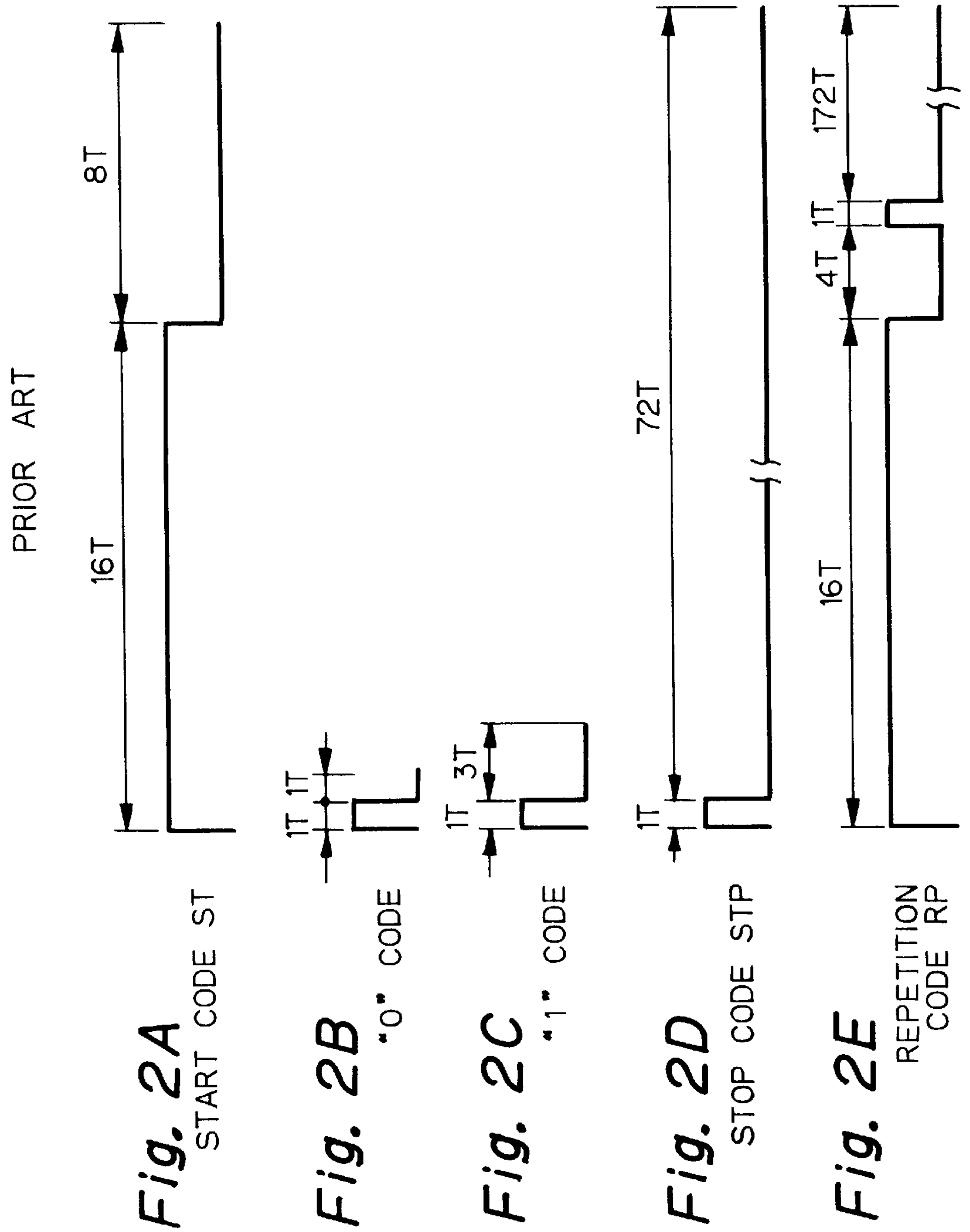
Fig. 2A START CODE ST
Fig. 2B "0" CODE
Fig. 2C "1" CODE
Fig. 2D STOP CODE STP
Fig. 2E REPETITION CODE RP

STP

ACK

NACK

INT1

INT2

INT3

INT4

INT5

| |
|---|
| Fig. 17A |
| Fig. 17B |

BIDIRECTIONAL REMOTE CONTROL SYSTEM USING INTERRUPT ARBITRATION

BACKGROUND OF THE INVENTION

1. Field of the Invention

The present invention generally relates to a remote control system and, more particularly, it relates to a remote control system using remote controllers using infrared rays for transmission paths of control codes.

2. Description of the Related Art

In a first prior art remote control system, since remote controllers have been developed to control a single equipment containing a signal receiver by means of a single signal transmitter, they are typically used as pairs comprising a transmitter and a receiver. This will be explained later in detail.

In the first prior art remote control system, however, since a single equipment containing a receiver is controlled by means of a single transmitter, a start code, an identification code and its inverted code and a stop code each time when transmitting 1 byte data, such a data transmission technique is cumbersome and poorly efficient when a large amount of data is transmitted.

In a second prior art remote control system (see JP-A-62-132494), a cascade configuration is adopted for two equipments, so that one of the equipments incorporating a receiver is connected by way of a signal line to the other of the equipments. This will also be explained later in detail.

In a third prior art remote control system (see JP-A-6-90484), an optical fiber and a light emitting plate for generating an infrared signal are provided between two equipments. Also, a light receiving section is provided in the lower order equipment. This will also be explained later in detail.

In the second and third prior art remote control systems, however, since they are arranged for one-way communication, these systems cannot simply be applied to bidirectional infrared communication because it can give rise to an arbitration-disabled status in a plurality of transmitters as they mask their own respective data to be transmitted and the received data.

In a fourth prior art remote control system (see JP-A-5-41693), an infrared communication system adapted only to half-duplex communication is so arranged that the transmission data is temporarily compressed and transmitted from a transmitter to a receiver as time-sharing data and the receiver recovers the original data by temporarily extending the received data. A similar process is carried out in the reverse direction and data are transmitted on a time-sharing basis as they are inserted into the gaps of the above time-sharing data so that apparently the system is adapted to full-duplex communication.

In the fourth prior art remote control system, although bidirectional communication may be realized, it is heavily lopsided on bidirectional communication and provides only a bidirectional communication path for a single set of a receiver and a transmitter so that it cannot control any existing remote control systems and has no upper compatibility.

In a fifth prior art remote control system (see JP-A-6-98383), a signal receiving time is made long relative to a signal transmitting time and the transmitter randomly changes the interval for transmitting data or the time for suspending data transmission, whereas the receiver is provided with means for avoiding any overlapping of transmitted data and selecting data containing the ID code of itself so that the problem that arises when data are transmitted from a plurality of remote controllers simultaneously can be effectively avoided.

In the fifth prior art remote control system, however, the control is complex.

Additionally, an infrared data communication system involving the use of an electronic notebook or a notebook-sized personal computer is known. The IrDA (Infrared Data Association) Standards are known as standards for such infrared data communications. The IrDA standards represent a system for infrared local area networks (LAN) and employ a protocol for high level data link procedures specifically improved for radio data communication for the data link layer to realize features including automatically specifying a communication path, transferring the control initiative and specifying an automatic ID for newly added equipment.

However, the remote control system using the IrDA standards is expensive and is not adapted to the technological field of remote control. Additionally, such a system is not compatible with other known remote control systems.

SUMMARY OF THE INVENTION

It is therefore an object of the present invention to provide a remote control system adapted to transmit and receive a large amount of data in an efficient way.

Another object of the invention is to provide a remote control system having upper compatibility.

Still another object of the invention is to provide a remote control system that can use low cost equipment and be adapted to bidirectional communication.

According to the present invention, a data format is formed by a start code, an identification code and its inverted code, a first data code and a second data code, each of these codes being a single byte code, which is then followed by an interrupt arbitration period. Thus, when compared with a prior art data format, an inverted data code and an stop code of the prior art one are replaced respectively by the second data code and the interrupt artibration period TI to realize upper compatibility. A remote controller transmitting a signal transmits an acknowledge code or a non-acknowledge code within the interrupt arbitration period depending on the interrupt code it receives after its current signal transmitting operation is temporarily switched to a signal receiving operation within the interrupt artibration period.

BRIEF DESCRIPTION OF THE DRAWINGS

The present invention will be more clearly understood from the description as set forth below, in comparison with the prior art, with reference to the accompanying drawings, wherein:

FIGS. 2A, 2B, 2C, 2D and 2E are timing diagrams showing basic codes used in the remote control system of FIG. 1;

DESCRIPTION OF THE PREFERRED EMBODIMENT

Before the description of the preferred embodiment, prior art remote control systems will be explained with reference to FIGS. 1, 2A, 2B, 2C, 2D, 3A, 3B, 3C, 4, 5 and 6.

Figure 1:
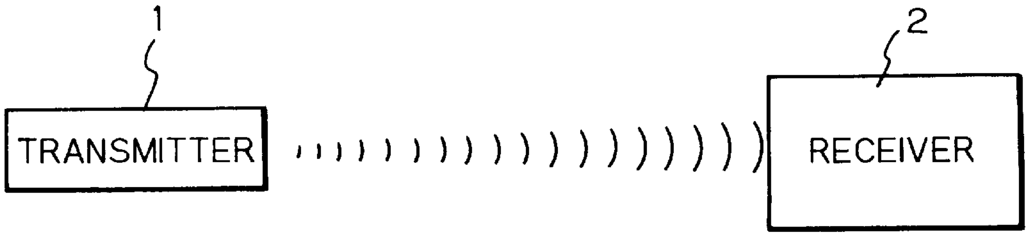
Fig. 1 PRIOR ART
FIG. 1 is a block circuit diagram illustrating a first prior art remote control system.

In FIG. 1, which illustrates a first prior art remote control system, a single remote controller or transmitter 1 and a single receiver 2 are provided. The transmitter 1 generates an infrared signal or the like and transmits it to the receiver 2. That is, the communication is carried out on a one-transmitter, one-receiver basis.

The transmitter 1 generates basic codes as shown in FIGS. 2A, 2B, 2C, 2D and 2E. That is, as shown in FIG. 2A, a start code ST is formed by a high level period of 16Ts (T is a basic unit time period) followed by a low level period of 8Ts. Also, as shown in FIG. 2B, a “1” code is formed by a high level period of 1T followed by a low level period of 1T, and as shown in FIG. 2C, a “0” code is formed by a high level period of 1T followed by a low level period of 3T. Further, as shown in FIG. 2D, a stop code STP is formed by a high level period of 1T followed by a low level period of 72T. In addition, as shown in FIG. 2E, a repetition cede RP is formed by sequentially arranging a high level period of 16T, a low level period of 4T, a high level period of T and a low level period of 172T.

Figures 3A, 3B, 3C:
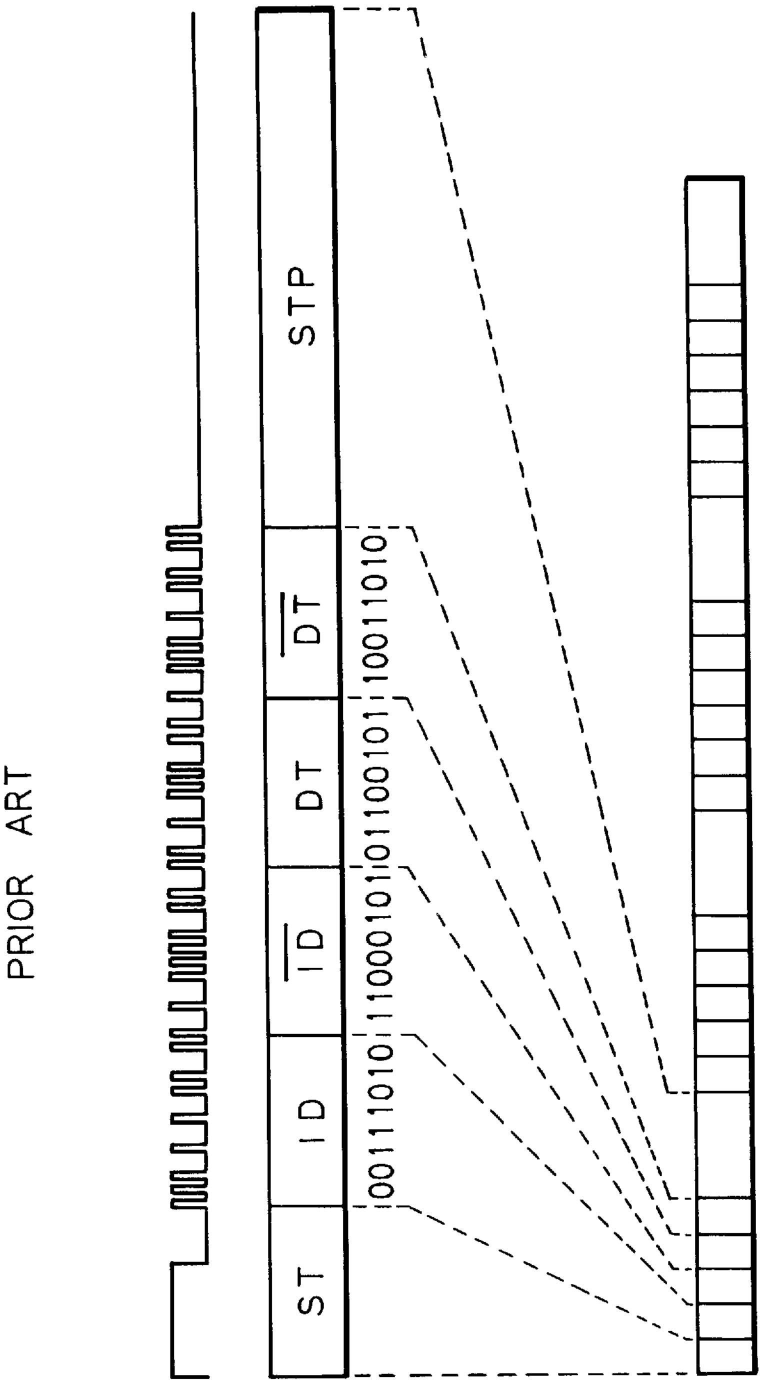
FIGS. 3A, 3B and 3C are timing diagrams showing a data format used in a transmission signal of the remote control system of FIG. 1.

A data format of the signal transmitted from the transmitter 1 is shown in FIGS. 3A, 3B and 3C. In more detail, FIG. 3A shows base band data, FIG. 3B shows a data format, and FIG. 3C shows upper data. In FIG. 3B, ST is a start code and STP is a stop code. Also, an identification code ID is a custom code identifying a supplier of the remote control system, and a data code DT is used for controlling a remotely controllable apparatus incorporating the receiver 2.

An inverted identification code following the identification code ID and an inverted data code following the data code DT are transmitted to the receiver 2 in order to avoid any errors in The operation thereof. That is, the receiver 2 performs an exclusive OR logic operation upon the paired codes to determine whether the received identification code ID and the received data code DT are correct or false. If the identification code ID or the data code DT is false, the received data will simply be discarded.

For transmitting data of more than 1 byte, only the data code DT is altered (see FIG. 3C).

The receiving operation of the receiver 2 is explained next with reference to FIG. 4 which is a flowchart of an operation started by turning ON the receiver 2.

First, at step 401, the microcomputer portion of the receiver 2 is cleared.

Next, at step 402, the receiver 2 waits for an input of a code. If a code is input, the control proceeds to step 403.

At step 403, it is determined whether or not the input code is a start code ST as shown in FIG. 2A, and at step 404, it is determined whether or not the input code is a repetition code RP as shown in FIG. 2E. As a result, if the input code is a start code ST, the control proceeds to step 405, while, if tie input code is a repetition code RP, the control proceeds to step 405. Otherwise, the control returns to step 402.

At step 405, a processing operation adapted to the repetition code RP is carried out.

At steps 406 and 407, when an identification code ID and its inverted code are taken in, the control proceeds to step 408 which performs an exclusive OR operation upon the paired codes to determine whether the identification code ID is correct or false. Note that, if the result of the exclusive OR operation is “11111111” (FF), the identification code ID is correct. As a result, if the identification code ID is correct, the control proceeds to step 409. Otherwise, the control returns to step 402. Note that, at steps 406 and 407, if the identification code ID or its inverted code is not taken in for a predetermined time period, the control returns to step 402.

At steps 409 and 410, when a data code DT and its inverted code are taken in, the control proceeds to step 411 which performs an exclusive OR operation upon the paired codes to determine whether the data code DT is correct or false. Note that, if the result of the exclusive OR operation is “11111111” (FF), the data code DT is correct. As a result, if the data code DT is correct, the control proceeds to step 412. Otherwise, the control returns to step 402. Note that, at steps 409 and 410, if the data code DT or its inverted code is not taken in for a predetermined time period, the control returns to step 402.

At step 412, when a stop code is taken in, the control proceeds to step 413 which compares the input stop code with a code STP as shown in FIG. 2D to determine whether the stop code STP is correct or false. As a result, if the stop code STP is correct, the control proceeds to step 414. Otherwise, the control returns to step 402. Note that, at step 412, if the stop code STP is not taken in for a predetermined time period, the control returns to step 402.

At step 414, the receiver 2 carries out a predetermined operation in accordance with the data code DT.

Then, the control at step 414 also returns to step 402.

In the remote control system of FIG. 1, however, since a single equipment containing a receiver is controlled by means of a single transmitter, a start code, an identification code and its inverted code and a stop code each time when transmitting 1 byte data, such a data transmission technique is cumbersome and poorly efficient when a large number of data are transmitted.

Meanwhile, as more sophisticated remote control systems have been developed In recent years, they are typically provided with a functional feature that makes them operate in a coordinated and cooperative manner. Examples of such systems include a plurality of equipment such as component-type stereo CD player/radio receiving sets and vides cassette recorders (VCRs) having a tape editing feature.

Additionally, more sophisticated devices developed in recent years are often designed to operate in a coordinated manner with many other equipments. When remotely controlling such a plurality of equipment, however, the data format illustrated in FIGS. 3A, 3B and 3C cannot provide bidirectional communication means nor means for conciliating the operations of a plurality of such devices. Thus, such a data format can be a bottle neck for the attempt to utilize a plurality of sophisticated equipment in a coordinated fashion.

Figure 5:
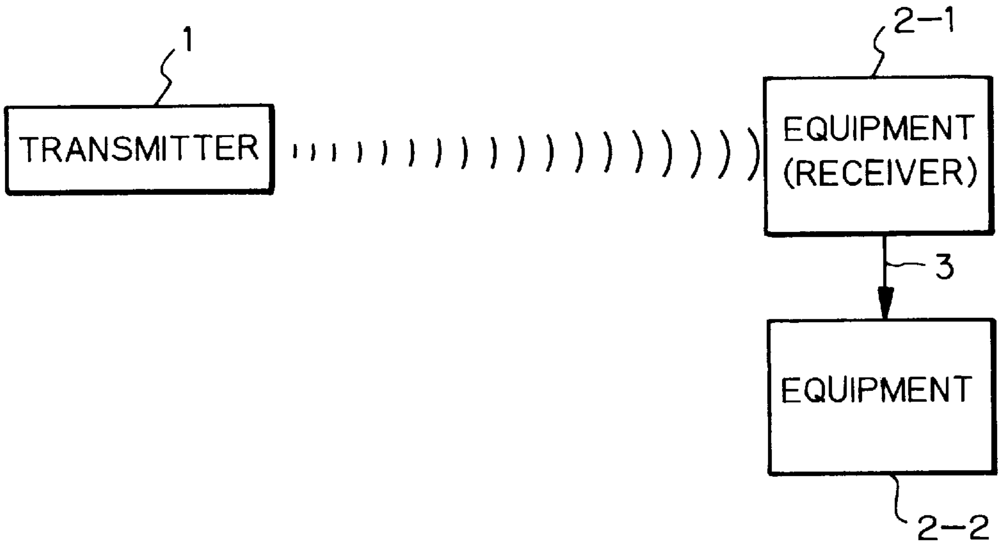
Fig. 5 PRIOR ART
FIG. 5 is a block circuit diagram illustrating a second prior art remote control system.

In FIG. 5, which illustrates a second prior a remote control system (see JP-A-62-132494), a cascade configuration is adopted, so that an equipment 2-1 incorporating a receiver is connected by way of a signal line 3 to another lower order equipment 2-2. In FIG. 5, a control signal in a format having a header, an equipment selection code and a command code is transmitted from the remote controller (transmitter) 1 to the equipment 2-1 and, if the equipment selection code in the received control signal agrees with the equipment ID (identifier) stored in the equipment 2-1 itself, the equipment 2-1 is controlled by the received control skill. If, on the other hand, the equipment selection code does not agree with the equipment ID, "1" is subtracted from the equipment selection code and the resultant code is used as a new equipment selection codes which is then transferred to the lower order equipment 2-2.

Figure 6:
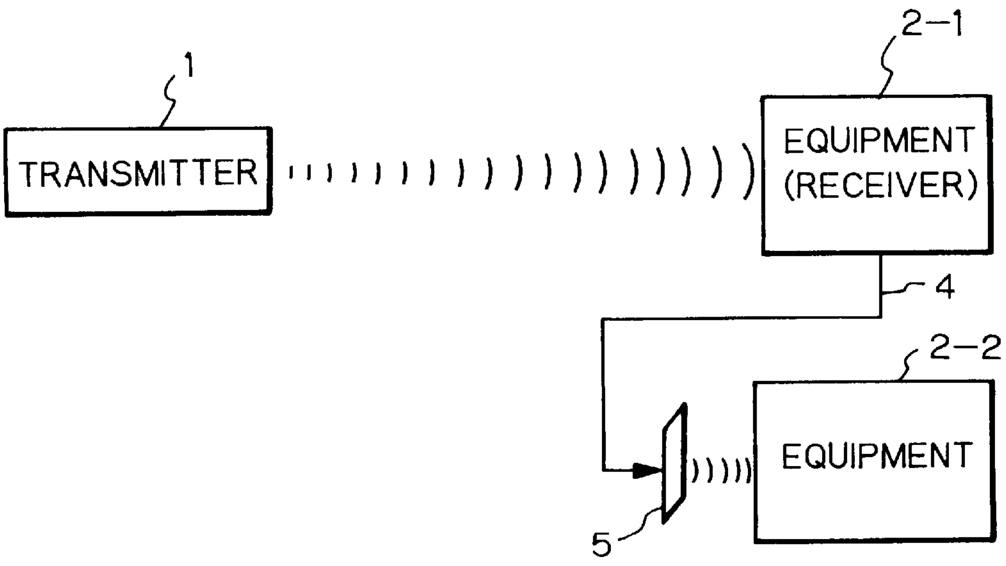
Fig. 6 PRIOR ART
FIG. 6 is a block circuit diagram illustrating a third prior art remote control system.

In FIG. 6, which illustrates a third prior art remote control system (see JP-A-6-90484), an optical to fiber 4 and a light emitting plate 5 for generating an infrared signal are provided between the equipment 2-1 and 2-2. Also, a light receiving section is provided in the equipment 2-2. In FIG. 6, a control signal in the above described data format is transmitted from the transmitter 1 to the equipment 2-1 and either the equipment 2-2 is controlled by the control signal or the transmitted signal containing a control signal for the equipment 2-2 is temporarily stored in or processed for conversion by the equipment 2-1. Then, the data of the stored or converted signal is transmitted to the equipment 2-2 by way of an infrared signal to control the latter when the processing operation on the signal transmitted from the transmitter 1 is completed. Further, an identification number ID has to be manually arranged for each of the equipments 2-1 and 2-2 so that they may be identified by means of the identification number ID.

In the prior art remote control systems of FIGS. 5 and 6, however, since they are arrangements for a one-way communication, these systems cannot simply applied to bidirectional infrared communication, because it is impossible to arbitrate when a plurality of transmitters generate signals siumlataneously, and also, they mask their received data when they are generating response signals.

Figure 7A:
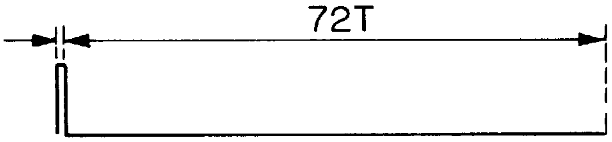
FIGS. 7A through 7H are timing diagrams showing basic codes according to the present invention.

In FIGS. 7A through 7H, which show basic codes, the basic codes as shown in FIGS. 7B through 7H according to the present invention are added to the basic codes as shown in FIGS. 2A through 2E. Note that the basic code as shown in FIG. 7A is the same is the stop code STP as shown in FIG. 2.

Figure 7B:
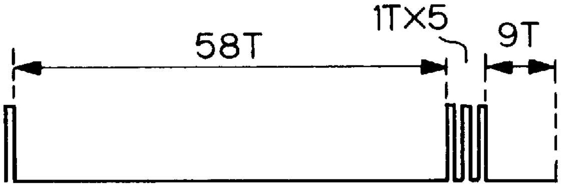
Figure 7C:
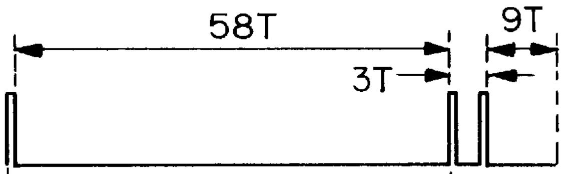
Figure 7D:
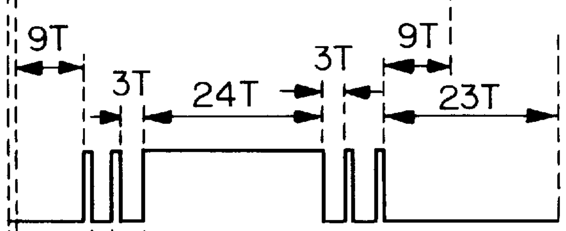
Figure 7E:
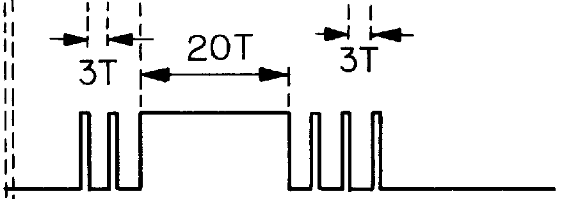
Figure 7F:
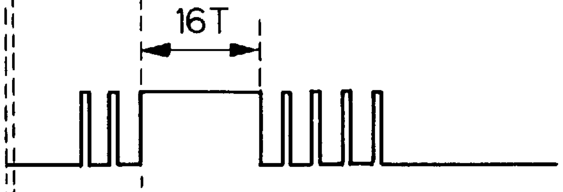
Figure 7G:
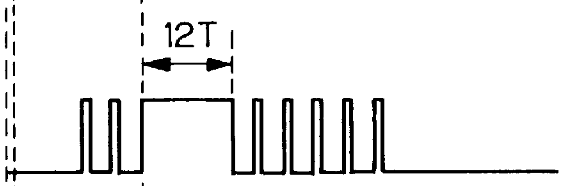
Figure 7H:
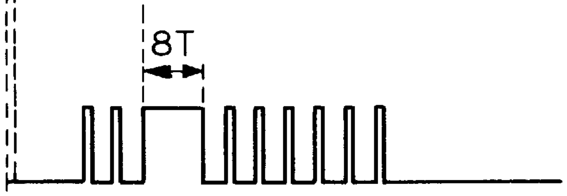

As shown in FIG. 7B, an acknowledge code ACK is formed by a high level period of 1T followed by a low level period of 58T. Subsequently, the code ACK is alternately brought to a high level period and a low level period after every 1T for a subsequent period of 5Ts before it is held again to a low level for a period of 9Ts to make the total period of the code equal to 73Ts. Also, as shown in FIG. 7C, a non-acknowledge code NACK is formed by a high level period of 1T followed by a low level period of 58T. Subsequently, the code NACK is held to a high level for the next 1T period and then to a low level for a period of 3Ts. Then, it is held to a low level for a 1T period before it is held again to a low level for a period of 9Ts to make the total period of the code equal to 73Ts.

FIGS. 7E, 7F, 7G and 7H indicate interrupt codes to be transmitted from an equipment requesting an interrupt during an interrupt arbitration period as will be described hereinafter. They indicate priority interrupt codes INT1, INT2, INT3, INT4 and INT5, respectively. In this case, among priority interrupt codes, the priority interrupt code INT1 has the highest priority, and the other priorities fall in the order of codes INT2, INT3, INT4 and INT5. That is, the priority interrupt code INT5 has the lowest priority.

Each of the priority interrupt codes has a total period of 73Ts and is held to a low level for a period of first 10Ts. Subsequently, it is held to a high level for a period of 1T and then to a low level for a period of 3Ts. After repeating this 1T-high and 3T-low cycle twice, it is held to a high level for a period of 24T. Thereafter, it is held to a low level for a period of 3Ts and then to a high level for a period of 1T. After repeating this 3T-low and 1T-high cycle twice, it is held to a low level for the remaining period of 23T.

The 24T level low period of the priority interrupt code INT1 is replaced by 20T, 16T, 12T and 8T respectively in the priority interrupt codes INT2, INT3, INT4 and INT5 of FIGS. 7E, 7F, 7G and 7H, the balances being filled respectively by three, four, five and six 1T-wide pulses that occur every 3Ts. Each of the above interrupt codes is provided with a switching allowance time of 9Ts prior to the first 1T-wide pulse and after the last 1T-wide pulse. As seen from FIGS. 7D through 7H, an interrupt code having the highest priority can be specified among two or more priority interrupt codes by carrying out a logical OR operation on these interrupt codes.

Figures 8A, 8B, 8C:
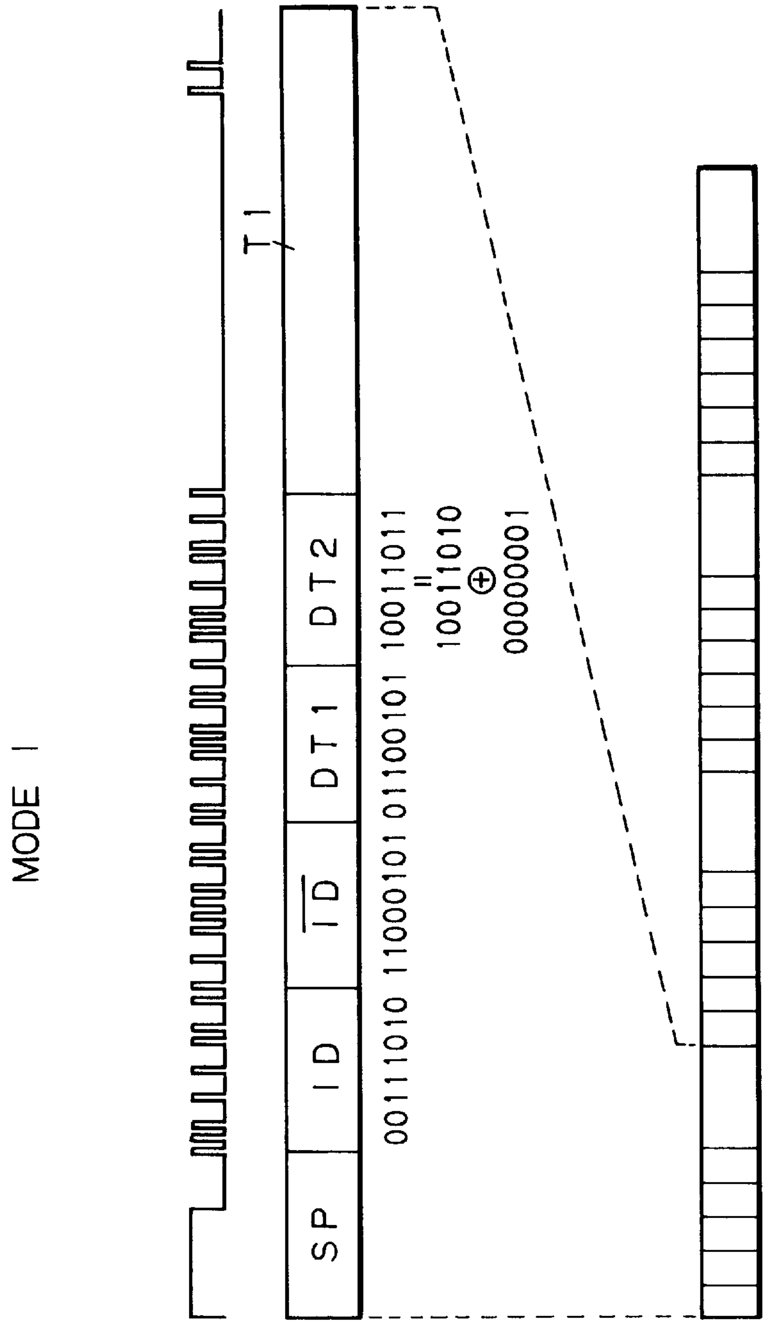
FIGS. 8A, 8B and 8C are timing diagrams showing a first extended data format according to the present invention.

According to the present invention, an extended data format (MODE I) as illustrated in FIGS. 8A through 8C and an extended data format (MODE II) as illustrated in FIGS. 9A through 9D in addition to the data format of FIGS. 3A, 3B and 3C are constituted by the basic codes of FIGS. 2A through 2D and FIGS. 7B through 7H. Note that the data format of FIGS. 3A, 3B and 3C is called a MODE 0 format.

The MODE I data format is explained next in detail. FIG. 8A shows a base band data, FIG. 8B shows a data format, and FIG. 8C shows upper data. The MODE I data format is formed by a start code SP, an identification code ID and its inverted code followed by a data code DT1 and a data code DT2, each of these codes being a single byte code. The data code DT2 is then followed by an interrupt arbitration period TI. Thus, when compared with the MODE 0 data format, the inverted data code and the stop code STP of the MODE 0 data format are replaced by the data code DT2 and the interrupt arbitration period TI, respectively. The data code DT2 is obtained by performing an exclusive OR operation upon the logical inversion value of the data code DT2 and "1", i.e., $$DT2=\overline{DT}1\oplus(00000001)$$

Note that 1-byte data is transmitted in a period of 24Ts. Also, a stop code STP, is omitted from FIGS. 8A, 8B and 8C, to simplify the description.

Figures 9A, 9B, 9C, 9D:
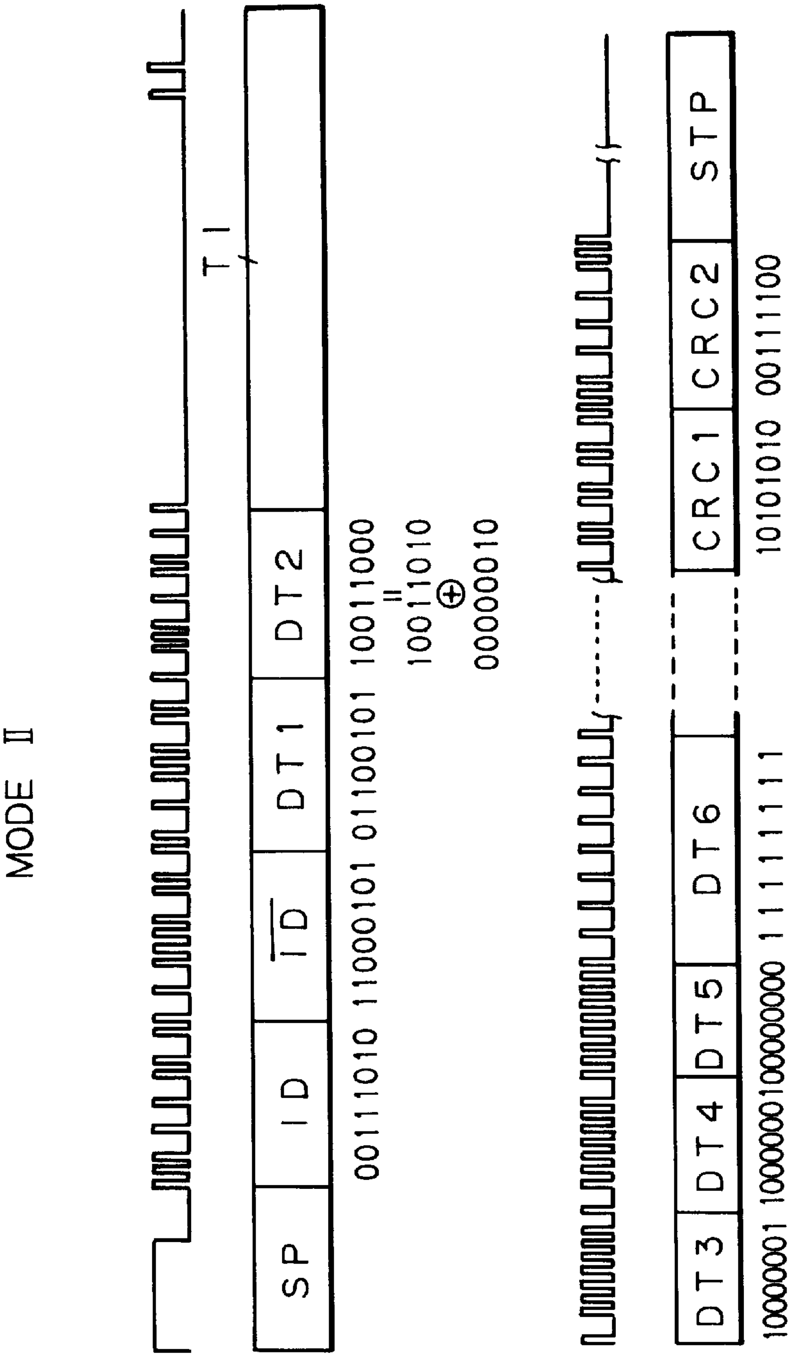
FIGS. 9A, 9B, 9C and 9D are timing diagrams showing a second extended data format according to the present invention.

The MODE II data format is explained next in detail. FIGS. 9A and 9C show base band data, and FIGS. 9B and 9D show a data format. That is, a plurality of data codes successively follow an interrupt arbitration period TI and a stop code STP is arranged at the tail end and preceded by a CRC code for error correction. In this extended mode (MODE II), the data code DT2 is obtained by performing an exclusive OR operation upon the logical inversion value of the data code DT1 and "2", i.e., $DT2=\overline{DT1}\oplus$"2"(00000010)

The interrupt arbitration period TI indicated in FIGS. 8B and 9B is used for conciliating interrupts by exchanging signals between a transmitting party and a receiving party to confirm the existence or non-existence of a signal in the period of 73Ts.

Remote control systems according to the present invention are illustrated in FIGS. 10, 11, 12, 13 and 14.

Figure 10:
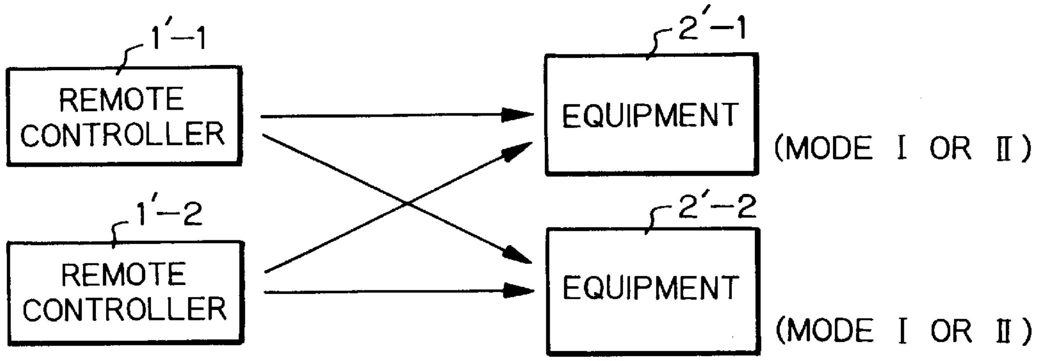
FIGS. 10 through 14 are block diagrams illustrating remote control systems according to the present invention.

In FIG. 10, remote controllers 1'-1 and 1'-2 have transmitting and receiving functions, and equipment 2'-1 and 2'-2 are capable of processing the MODE I data format or the MODE II data format. In FIG. 10, assume that the remote controllers 1'-1 and 1'-2 are trying to transmit signals simultaneously. If the remote controller 1'-1 remotely controls the equipment 2'-1 and the remote controller 1'-2 controls the equipment 2'-2, the proper corresponding relationships are disturbed by the signal directed from the remote controller 1'-1 to the equipment 2'-2 and the signal directed from the remote controller 1'-2 to the equipment 2'-1.

While the prior art remote control system may simply become defunct on such an occasion, the remote control system of FIG. 10 suspends Its operation without giving rise to any malfunctioning on the part of the signal receiving algorithm of the equipment 2'-1 and/or 2'-2. More specifically, since a reception period is provided within the interrupt arbitration period, any remote controller of the system of FIG. 10 that is currently transmitting a signal can find out if any other remote controller is also transmitting a signal or not so that, if a signal is being transmitted from some other remote controller, it can take measures to avoid such a disturbance at the level of an application program (e.g., by temporarily suspending the signal transmission). In short, the remote controller can at least suspend its operation under such disturbance circumstances.

Figure 11:
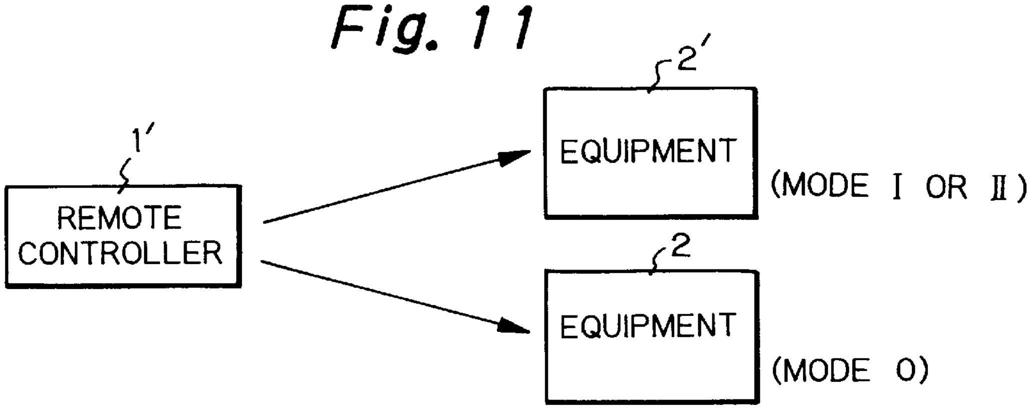

In FIG. 11, an equipment 2' is capable of processing the MODE I format data or the MODE II format data, while an equipment 2 is capable of processing only the MODE 0 data format. More specifically, because the data code DT2 of the MODE I data format or the MODE II data format is different from the bit-inversion value of the data code DT of the MODE 0 data format, the equipment 2 does not regard the subsequent signals as those addressed to it. Thus, the equipment 2 does not respond to these signals.

Figure 12:
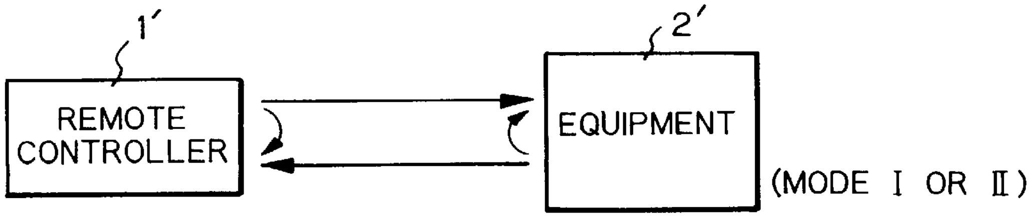

In FIG. 12, assume that the remote controller 1' and the equipment 2' are bidirectionally communicating with each other in the MODE I or MODE II data format. That is, if the remote controller 1' is transmitting a signal and the equipment 2' is currently receiving it, the remote controller 1' has its own transmission signal wrapped around and applied to its reception circuit.

If the transmitting party and the receiving party are switched during a arbitration period, the reception circuit is required to respond to the switch and come into operation quickly but the remote controller 1' would normally take time in responding the switch due to the low cost parts it comprises. In view of this fact, the configuration of each signal code is ingeniously devised in a remote control system according to the invention and provided with a switching allowance time of 9Ts both at the beginning and at the end as shown in FIGS. 7B through 7H.

Figure 13:
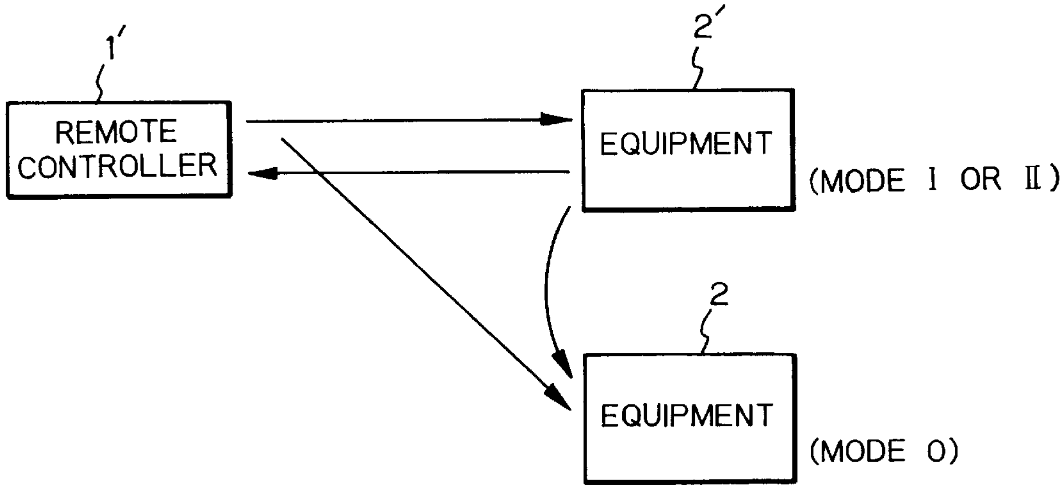

In FIG. 13, the remote controller 1' and the equipment 2' are bidirectionally communicating with each other. In this case, the equipment 2 should be prevented from malfunctioning. For this purpose, each of the priority interrupt codes INT1 through INT5 in FIGS. 7D through 7H is provided with pulses of a high level 1T and a low level 3Ts before and after the high level signal period having a length between 8Ts and 24Ts. These added pulses can effectively prevent a situation where the priority interrupt code of the remote controller 1' or the equipment 2' is mistaken for a start code by the equipment 2.

Figure 14:
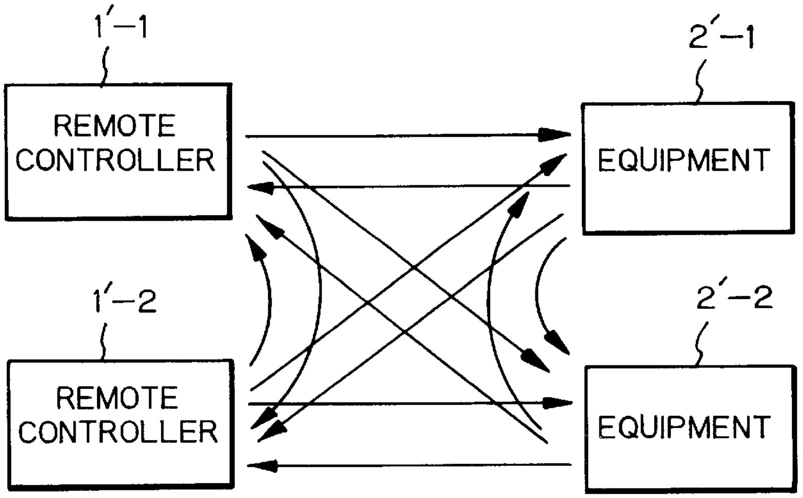

In FIG. 14, generally, a large number of signal transmission paths can exist among the remote controllers 1'-1 and 1'-2 and the equipments 2'-1 and 2'-2, and the remote controllers 1'-1 and 1'-2 can remotely and independently control the respective operations of the corresponding equipments 2'-1 and 2'-2 without malfunctioning regardless of the large number of possible signal transmission paths. Note that there may be cases where the equipments 2'-1 and 2'-2 issue an interrupt request while receiving a signal or some other remote controller that is not transmitting a signal may receive a remote control signal and issue an interrupt request.

Figure 15:
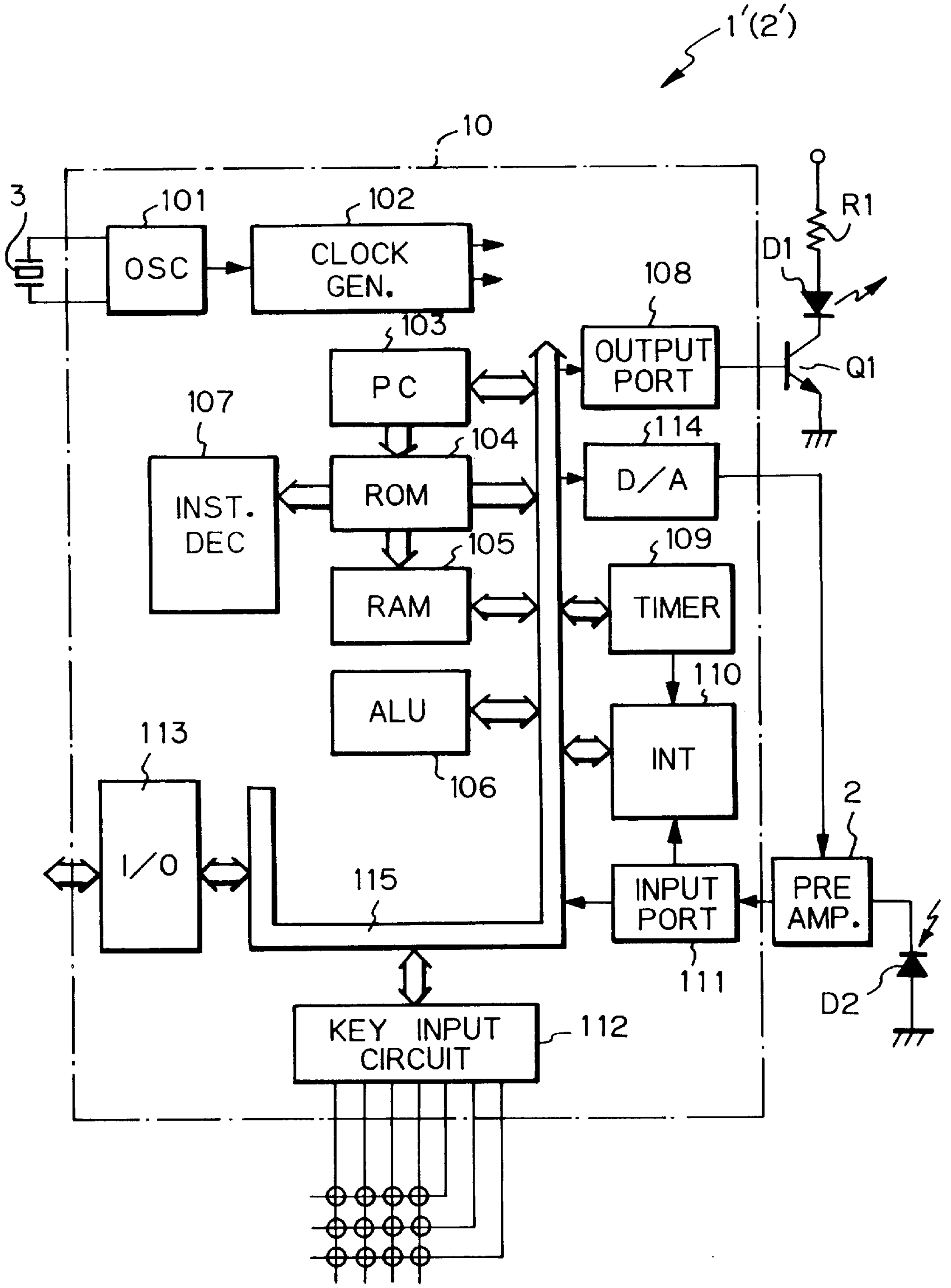
FIG. 15 is a block circuit diagram of the remote controller and equipment of FIGS. 10 through 14.

In FIG. 15, which is a detailed circuit diagram of the remote controller 1' (1'-1, 1'-2) and the receiving/transmitting portion of the equipment 2' (2'-1, 2'-2) of FIGS. 10 through 14, for example, the remote controller 1' is formed by a microcontroller 10, a drive transistor Q1 having its emitter is grounded, an infrared-emitting diode D1 having its cathode connected to the collector of the drive transistor Q1, a resistor R1 connected between the anode of the infrared-emitting diode D1 and the positive terminal of a power source, a photodiode D2 and a preamplifier 2. The drive transistor Q1, the infrared-emitting diode D1 and the resistor R1 form an infrared emitting section, whereas the photodiode D2 and the preamplifier 2 form an infrared receiving section.

The microcontroller 10 includes an oscillator 101 connected to an externally arranged crystal resonator 3, an internal clock generating circuit 102 for generating an internal clock by dividing the frequency of a constant frequency signal having a stabilized high frequency produced from the oscillator 101, a program counter 103, a read only memory (ROM) 104 storing programs and other data, a random access memory (RAM) 105, an arithmetic logic unit (ALU) 106, an instruction decoder 107, an output port 108 connected to the base of the transistor Q1, a timer 109, an interrupt circuit 110, an input port 111 for the preamplifier 2, a key input circuit 112, an input/output port 113, and a digital/analog converter 114 for controlling the gain of the preamplifier 2. The program counter 103, the ROM 104, the RAM 105, the ALU 106, the output circuit 108, the timer 109, the interrupt circuit 110, the input circuit 111, the key input circuit 112 and the Input/output port 113 are connected by an internal bus 115.

Note that, although the configuration of the receiving/transmitting portion of the equipment 2' (2'-1, 2'-2) is substantially the same as that of the remote controller 1' (1'-1, 1'-2), the key input circuit 112 may be omitted from the receiving/transmitting portion of the equipment 2' (2'-1, 2'-2).

Figure 16:
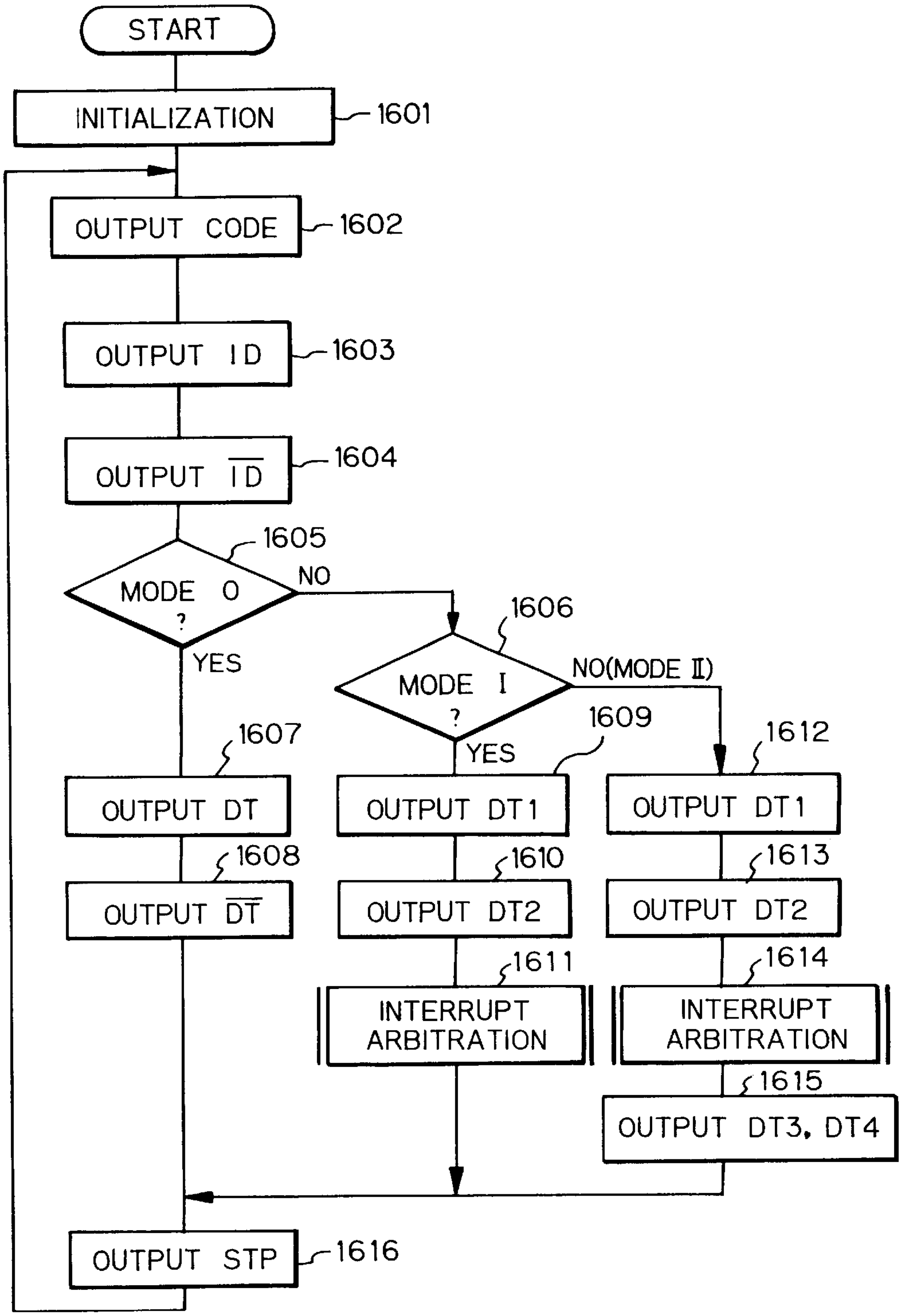
FIG. 16 is a flowchart showing a transmitting operation of the remote control system according to the present invention.

The transmitting operation of the remote controller 1' (1'-1, 1'-2) will be explained next with reference to FIG. 16 which is a flowchart started by turning ON the remote controller 1' (1'-1, 1'-2).

First, at step 1601, the RAM 105 and the like are cleared.

Next, at steps 1602, 1603 and 1604, a start code ST, an identification code ID and its inverted code are output. Note that a string of pulses corresponding to the outputs and those described hereinafter is applied to the base of the drive transistor Q1 by way of the output port 108 to turn ON and OFF the drive transistor Q1 in order to control the drive current flowing to the infrared-emitting diode D1 and hence the intensity of its infrared emission.

Subsequently, at step 1605, it is determined whether or not a mode value which is set by the key input circuit 112 is equal to "0" (MODE 0), and at step 1606, it is determined whether or not the mode value is equal to "1" (MODE I). As a result, if the mode value is "0" (MODE 0), the control proceeds to steps 1607 and 1608; if the mode value is "1" (MODE I), the control proceeds to steps 1609 through 1611; and if the mode value is "2" (MODE II), the control proceeds to steps 1612 through 1615.

Steps 1607 and 1608 including step 1616 are explained next. That is, a data code DT, its inverted code and a stop code STP are sequentially output. As a result, a remote control signal having a data format as shown in FIGS. 3A, 3B and 3C is sent out from the remote controller 1' (1'-1, 1'-2) in the mode MODE 0. In other words, the remote controller 1' (1'-1, 1'-2) is compatible with the prior art remote controller.

Steps 1609, 1610 and 1611 including step 1616 are explained next. That is, a data code DT1 and a data code DT2 are sequentially output. Then, the remote controller 1' (1'-1, 1'-2) operates for interrupt artibration before it outputs a stop code STP to terminate the operation As a result, a remote control signal having a data format in FIGS. 8A, 8B and 8C is transmitted in the extended mode MODE I.

Steps 1612, 1613, 1614 and 1615 including step 1616 are explained next. That is, a data code DT1 and a data code DT2 are sequentially output. Then, the remote controller 1' (1'-1, 1'-2) operates for interrupt arbitration before it sequentially outputs data codes once again. Finally, it outputs a stop code STP to terminate the operation. As a result, a remote control signal having the data format in FIGS. 9A and 9B is transmitted in the extended mode MODE II. It will be seen that a large number of data are sequentially transmitted in this case.

Note that, in the extended mode MODE I or MODE II and even in a transmission mode, the microcontroller temporarily suspends transmission during an interrupt arbitration period at steps 1611 and 1614 and makes itself ready for reception to check if there is an interrupt made by some other equipment by means of the instruction decoder 107. If it determines that there is an interrupt, it transits an acknowledge code ACK as indicated in FIG. 7B in an interrupt arbitration period TI. If not, it transmits a non-acknowledge code NACK as indicated in FIG. 7C.

Figures 17, 17A:
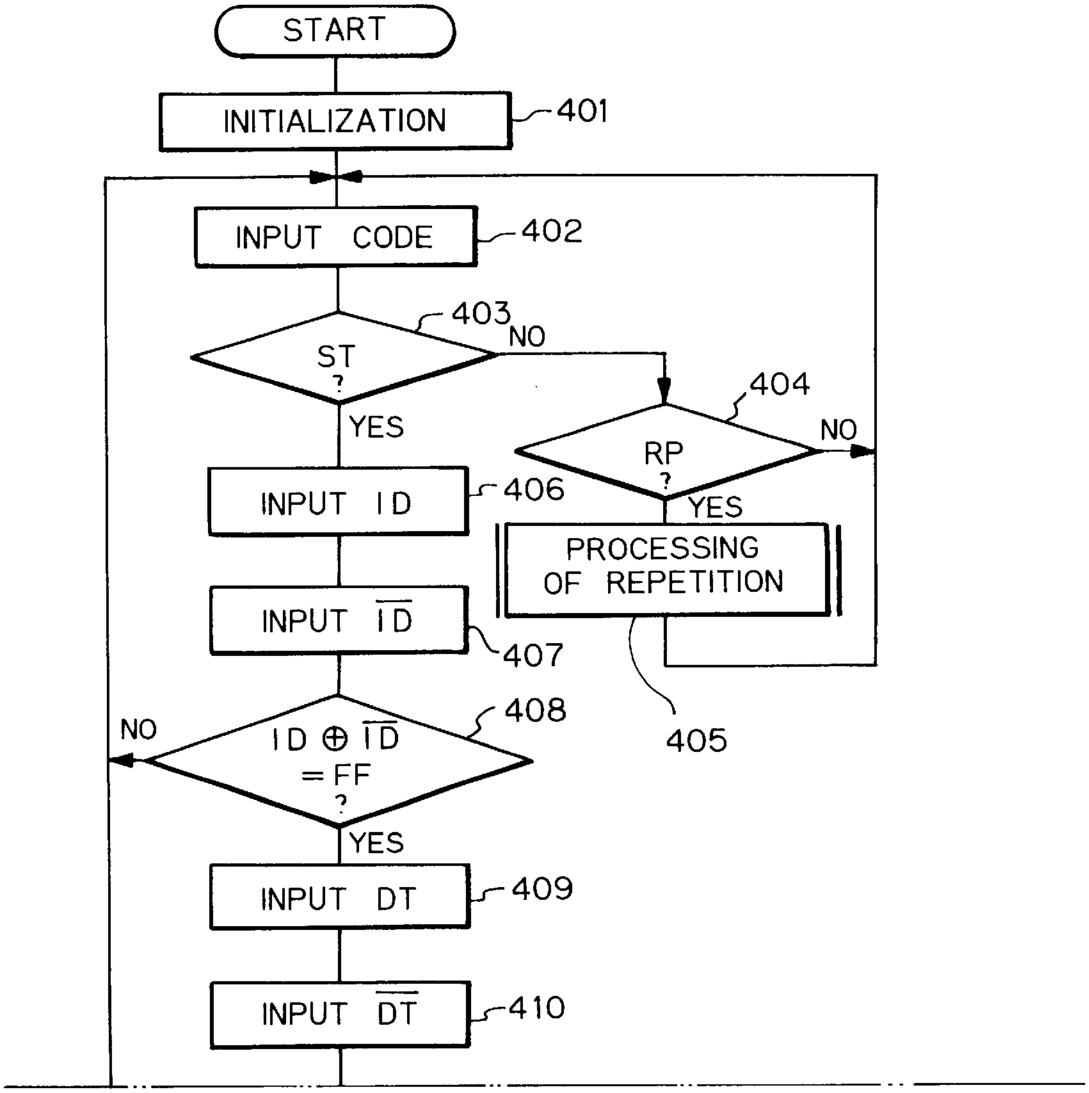
FIGS. 17A and 17B are a flowchart showing a receiving operation of the remote control system according to the present invention.
Figure 17B:
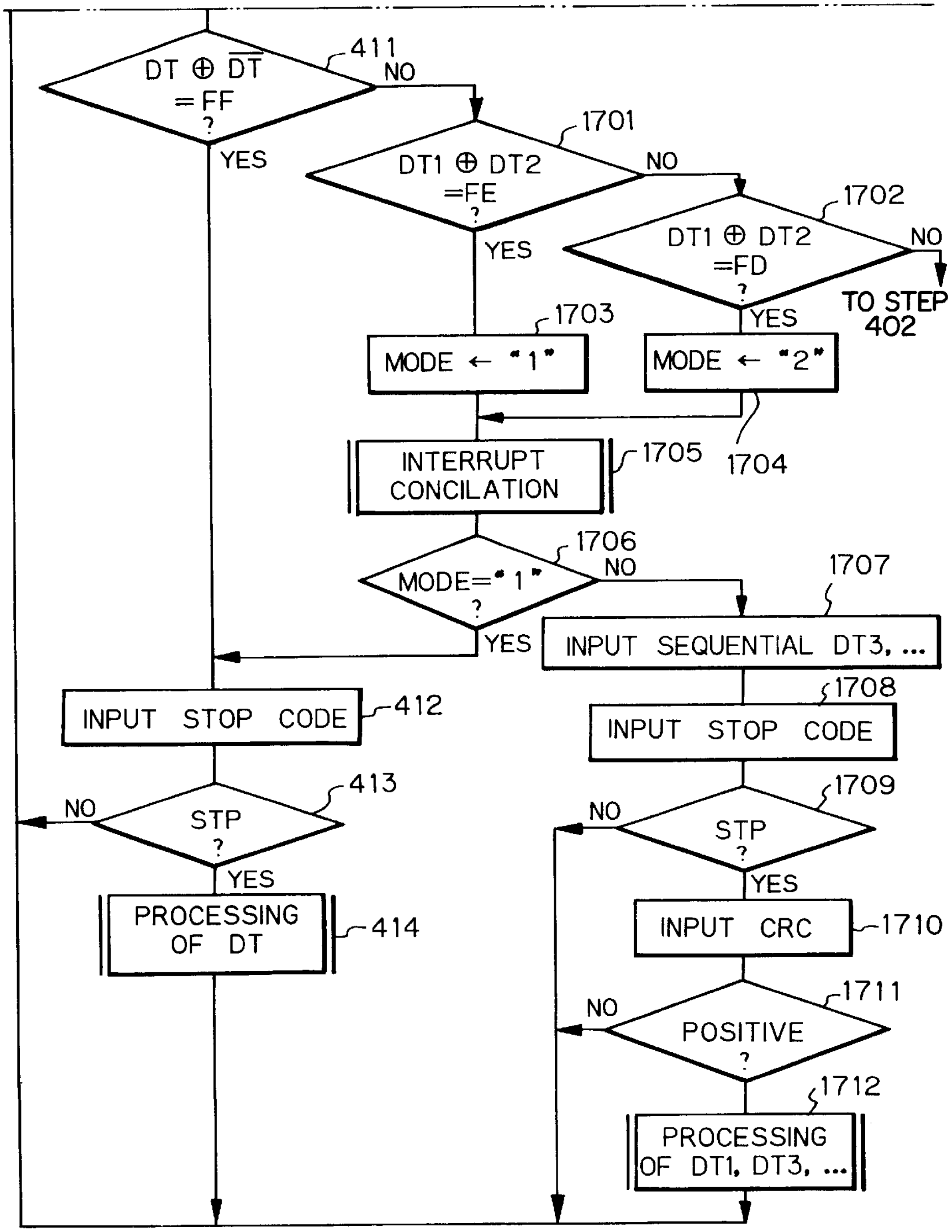

The receiving operation of the remote controller 1' (1'-1, 1'-2) and the equipment 2' (2'-1, 2'-2) will be explained next with reference to FIGS. 17A and 17B which are a flowchart of an operation started by turning ON the remote controller 1' (1'-1, 1'-2) or the equipment 2' (2'-1, 2'-2). In FIG. 17, note that steps 1701 through 1712 are added to the elements of FIG. 4.

That is, in FIG. 17, at steps 411, 1701 and 1702, an exclusive OR operation is performed the pair of data codes DT (DT1) and DT (DT2). If the result of the exclusive OR operation is 11111111 (FF), the data format is MODE 0. Also, if the result of the exclusive OR operation is 11111110 (FE), the data format is MODE I. Further, if the result of the exclusive OR operation is 11111101 (FD), the data format is MODE II. As a result, if the result is FF, the control proceeds to step 412. Also, if the result is FE, the control proceeds to step 1703 which sets "1" in a mode value MODE, and then proceeds to step 1705. Further, if the result is FD, the control proceeds to 1704 which "2" in the mode value MODE, and then proceeds to step 1705. Note that, if the result is none of FF, FE and FD, the control returns to step 402.

Figure 4:
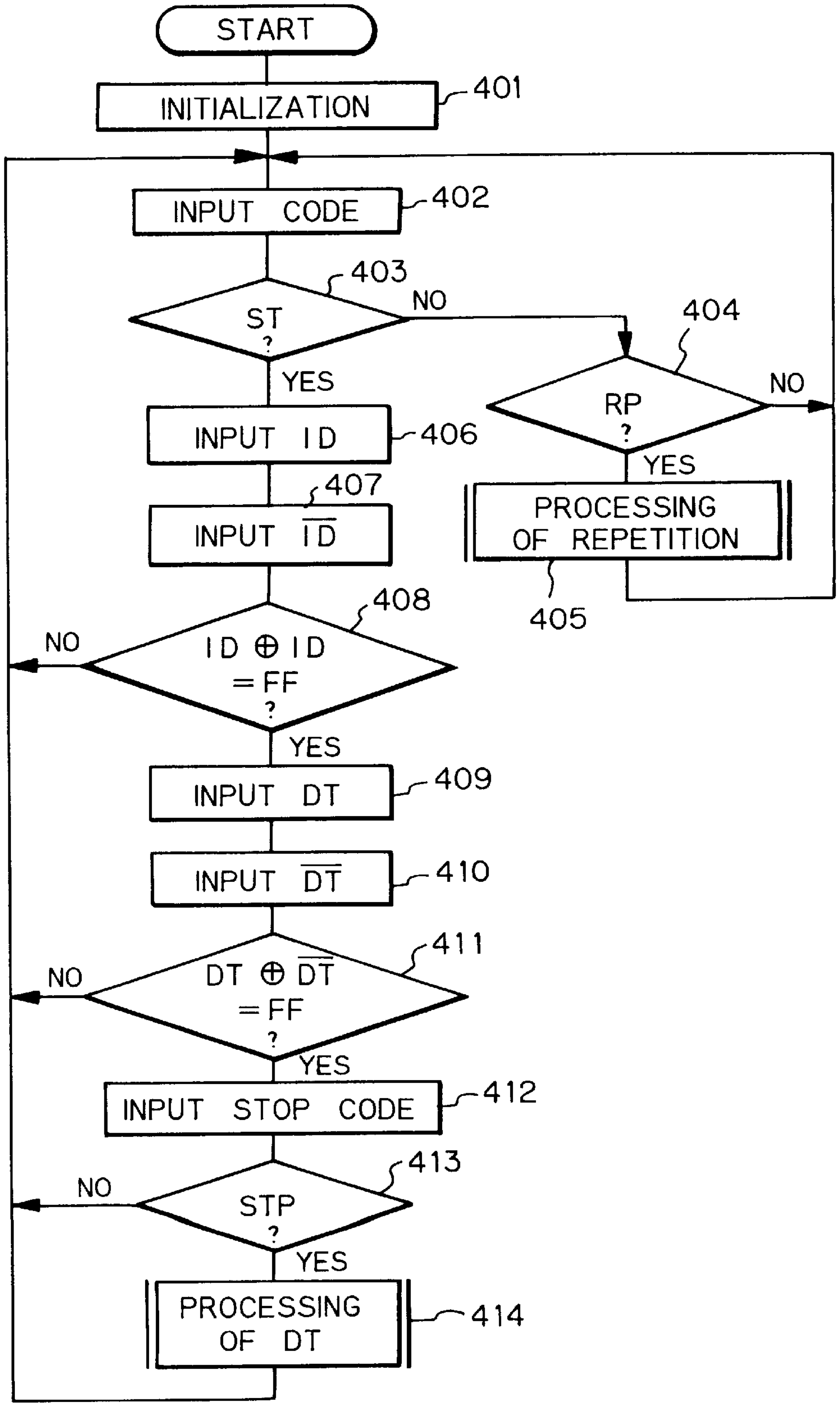
Fig. 4 PRIOR ART
FIG. 4 is a flowchart showing the operation of the receiver of FIG. 1.

When the data format is MODE 0, in the same way as in FIG. 4, at step 412, when a stop code is taken in, the control proceeds to step 413 which compares the input stop code with a code STP as shown in FIG. 2D to determine whether the stop code STP is correct or false. As a result, if the stop code STP is correct, the control proceeds to step 414. Otherwise, the control returns to step 402. Note that, at step 412, if the stop code STP is not taken in for a predetermined time period, the control returns to step 402. At step 414, the receiver 2 carries out a predetermined operation in accordance with the data code DT. Then, the control at step 414 also returns to step 402.

At step 1705, an operation for interrupt arbitration is carried out, which will be explained later in detail.

Next, at step 1706, it is determined whether the mode value MODE is "1" or "2". If MODE is "1", the control proceeds to steps 412 to 414 which are the same as those in the data format MODE 0. On the other hand, if the mode value MODE is "2", the control proceeds to step 1707.

At step 1707, sequential data is taken in.

Next, at step 1708, when a stop code is taken in, the control proceeds to step 1709 which compares the input stop code with a code STP as shown in FIG. 2D to determine whether the stop code STP is correct or false. As a result, if the stop code STP is correct, the control proceeds to step 1710. Otherwise, the control returns to step 402. Note that, at step 1709, if the stop code STP is not taken in for a predetermined time period, the control returns to step 402.

At step 1710, CRC codes are taken in, and at step 1711, the input sequential data are checked in accordance with the CRC codes. As a result, if the CRC checking is positive, the control proceeds to step 1712 which carries out predetermined operations in accordance with the data codes DT1, DT3, DT4, . . . . Thus, in the extended mode MODE II, the microcomputer 10 can consecutively receive any bit pattern in a continuous portion of data codes. Note that FIGS. 9A, through 9D show an example of high level data link control (HDLC) protocol data codes.

The interrupt arbitration period at step 1705 will now be described further. If equipment other than a remote controller tries to interrupt a signal transmission/reception session, the interrupting party receives the data being transmitted from the transmitting remote controller to realize start/stop synchronization for itself and find out an interrupt artibration period. It then transmits its priority interrupt code in one of the formats as shown in FIGS. 7D through 7H in the interrupt arbitration period.

The transmitting party temporarily moves into a reception status in the interrupt arbitration period as described earlier. Then, if there is only a single interrupting party, it receives the priority interrupt code in one of the formats as shown in FIGS. 7D through 7H but, if there are a plurality of interrupting parties, it receives a code produced by overlapping the priority interrupt codes coming from the interrupting parties. Since the highest priority is given to a priority interrupt code having a smaller code number and a higher priority due to the result of a logical OR operation when the priority interrupt codes are overlapped, the transmitting party determines by presumption the status implied by the code and the contents of the data to be transmitted by means of the application program in operation and then transmits an acknowledge code ACK or non-acknowledge code NACK depending on what it determines during a predetermined transmission period after the reception period in the interrupt arbitration period is over and within the last three or two pulses of the code as shown in FIG. 7B or 7C. Note that FIG. 8A shows an example when an acknowledge code ACK is transmitted.

Thus, an acknowledge code as shown in FIG. 7B or a non-acknowledge code as shown in FIG. 7C and one or more than one priority interrupt codes of FIGS. 7D through 7H are transmitted during an interrupt arbitration period. Therefore, the receiving party receives a signal obtained by overlapping the code by means of a logical OR operation. Thus, during the operation of interrupt arbitration being carried out by the receiving party in step 1705, it receives a acknowledge code or non-acknowledge code signal indicating the priority level of the interrupt code issued by the interrupt party and the transmitting party accepts the interrupt or not and then hoists a flag responding to it before it carries out an operation of processing the code. In this case, it discards or simply holds the signals it has received, although the operation may vary depending on the application program. The processing operation for responding the signal largely depends on the application program and hence is variable to a large extent.

Also, the gain of the preamplifier 2 can be limit so as not to receive uncertain data transmitted from a point separated almost by the largest transmissible/receivable distance for signals, because the gain of the preamplifier 2 can be varied in accordance with the output of the D/A converter 114.

In the above-described embodiment, while the remote controller is designed to transmit and receive infrared ray having an optical intensity modulated by base band data, the present invention is by no means limited thereto and the remote controller may be so designed as to transmit and receive infrared ray having an optical intensity modulated by the carrier with 30 to 50 kHz that is in turn modulated by data. Furthermore, the infrared ray may be replaced by ultrasonic waves or radio waves.

As explained hereinabove, according to the invention, a conventional controlled equipment can be controlled unidirectionally in the prior art manner when it transmits a remote control signal in a data format MODE 0 designed to transmit/receive signals in the prior art remote control system. On the other hand, the controlled equipment is switched to the reception mode in an interrupt artibration period if a remote controller of a remote control system according to the invention is transmitting a signal when the controlled equipment transmits a remote control signal in the data format MODE II having a fictional upper compatibility with a remote control signal in the data format MODE I so that the transmitting party determines the status implied by the reception interrupt code and the contents of the data the transmitting party is trying to send by means of a signal and decides if it should continue the transmission or communicate with the interrupting party to transmit an acknowledge code or non-acknowledge code depending on its decision. Thus, the controlled equipment is allowed to carry out an operation of processing the received signal according to the acknowledge code or the non-acknowledge code and the priority level of the priority interrupt code it receives during the interrupt arbitration period and the remote controllers can bidirectionally control the related controlled devices.

Additionally, since an interrupt arbitration period is provided in the data format, a third equipment can interrupt the current communication in order to exchange data with priority when the remote controller and the controlled equipment are exchanging data.

Still additionally, since an equipment controlled by a remote control signal in the prior art first data format MODE 0 does not respond to a remote control signal in the data format MODE II, equipment controlled by a remote control signal in the prior art first data format and those controlled by a remote control system can coexist under the same operating conditions. Thus, any of the controlled equipments can be selected by appropriately changing the transmission mode on the part of the transmitting party.

Furthermore, since it is possible to transmit and receive data having a transmissivity secured by a continuous data code portion in the mode MODE II, data can be transmitted in any bit pattern so that data with a HDLC protocol developed by local area network (LAN) can be transmitted and received. Thus, the telecommunication route determining procedure of highly sophisticated HDLC and a sophisticated arbitration procedure can be applied for the purpose of the present invention.

In addition, since each priority interrupt code is provided with a switching allowance time, the present invention can be used with low cost circuits that require a relatively long switching time. Furthermore, when a remote controller and a controlled equipment receive a plurality of equipment issue interrupt codes simultaneously, the remote controller and the controlled equipment can determine the interrupt code with the highest priority out of the received interrupt codes by means of a simple technique of logical OR operation.

Finally, it is possible to realize a highly reliable remote control operation that effectively prevents uncertain data transmitted from a point separated almost by the largest transmissible/receivable distance for signals from being received.

I claim:

1. A remote control system including a remote controller and an equipment controlled by said remote controller, wherein said remote controller comprises:

a remote controller having means for selectively transmitting a first remote signal of a first data format formed sequentially by a first start code, a first data code, an inverted code of said first data code and a first stop code, and a second remote signal of a second data format formed sequentially by a second start code, a second data code, a logic code having a predetermined logic relationship to said second data code and an interrupt arbitration period; and means for responding to a priority interrupt code received in said interrupt arbitration period of a current transmission period and transmitting one of an acknowledge code and a non-acknowledge code in accordance with said priority interrupt code and contents of data to be transmitted, said equipment comprising:

means for determining whether a received signal is said first remote signal or said second remote signal; and determining and performing means for determining a priority level of said priority interrupt code and performing a processing operation upon said received signal in accordance with one of said acknowledge code and said non-acknowledge code received in said interrupt arbitration period, when said received signal is said second remote signal.

2. The system as set forth in claim 1, wherein at least one of said remote controller and said equipment comprises interrupt code generating means for generating a priority interrupt code formed by adding data of one of 1 and 0 to the begining and end of a predetermined period with a predetermined logic value during said interrupt arbitration period of said second remote control signal.

3. The system as set forth in claim 2, wherein said priority interrupt code has a predetermined switching allowing time with a signalless code between a code signal portion of one of said acknowledge code and said non-acknowledge code and a signal portion of said priority interrupt code.

4. The system as set forth in claim 2, wherein, when a signal transmission and a signal reception take place simultaneously, said interrupt code generating means generates one of a plurality of different interrupt codes having mutually different length for the predetermined logical value for the effect of masking low priority codes and formed by adding a data value of 1 or 0 to the beginning and end of the predetermined period with the predetermined logical value, said response transmitting means and said determining and processing means respectively determining the received interrupt codes by receiving signals obtained by carrying out a logical OR operation on the received respective interrupt codes.

5. The system as set forth in claim 1, wherein said second remote signal is one of a first extended signal where a second stop code follows said interrupt arbitration period and a second extended signal where data codes are consecutively arranged for a desired period after said interrupt arbitration period and are followed by a third step code.

6. The system as set forth in claim 1, wherein each of said remote controller and said equipment comprises means for controlling a gain of a preamplifier for amplifying a received signal according to the level of the received signal.

* * * * *